(12) United States Patent
Alfia et al.

(10) Patent No.: US 9,417,720 B2
(45) Date of Patent: Aug. 16, 2016

(54) FAST VIRTUAL MEDIA KVM SYSTEM

(71) Applicant: Trippe Manufacturing Company, Chicago, IL (US)

(72) Inventors: Yaron Alfia, Shoham (IL); Miki Wechsler, Rishon Letzion (IL); Shlomo Bergman, Modiin (IL)

(73) Assignee: TRIPPE MANUFACTURING COMPANY, Chicago, IL (US)

( * ) Notice: Subject to any disclaimer, the term of this patent is extended or adjusted under 35 U.S.C. 154(b) by 188 days.

(21) Appl. No.: 14/164,860

(22) Filed: Jan. 27, 2014

(65) Prior Publication Data

US 2014/0280844 A1    Sep. 18, 2014

Related U.S. Application Data

(60) Provisional application No. 61/792,919, filed on Mar. 15, 2013.

(51) Int. Cl.
| | |
|---|---|
| *G06F 15/173* | (2006.01) |
| *G06F 3/038* | (2013.01) |
| *G06F 3/023* | (2006.01) |
| *G06F 3/14* | (2006.01) |
| *G09G 5/00* | (2006.01) |

(52) U.S. Cl.
CPC ............... *G06F 3/038* (2013.01); *G06F 3/023* (2013.01); *G06F 3/14* (2013.01); *G09G 5/006* (2013.01); *G09G 2370/04* (2013.01); *G09G 2370/24* (2013.01)

(58) Field of Classification Search
USPC ........................................................ 709/223
See application file for complete search history.

(56) References Cited

U.S. PATENT DOCUMENTS

| | | | |
|---|---|---|---|
| 5,936,963 A * | 8/1999 | Saussy | H04L 12/413 370/447 |
| 7,415,552 B2 | 8/2008 | Chen | |
| 7,752,339 B2 | 7/2010 | Sim et al. | |
| 8,024,502 B2 | 9/2011 | Zhang et al. | |
| 2001/0056516 A1 * | 12/2001 | Schollenberger | H05K 7/1479 710/305 |
| 2004/0095510 A1 * | 5/2004 | Suzuki | H04N 7/035 348/465 |
| 2005/0235079 A1 | 10/2005 | Chen | |
| 2006/0198389 A1 | 9/2006 | Eriokson et al. | |
| 2007/0109263 A1 | 5/2007 | Sim et al. | |
| 2008/0040527 A1 | 2/2008 | Filipov et al. | |
| 2008/0155124 A1 | 6/2008 | Compton et al. | |
| 2009/0144479 A1 | 6/2009 | Cui et al. | |

(Continued)

OTHER PUBLICATIONS

Adder; "KVM & IP Control Technology Control Professional Computer & Service Control Solutions" CATx Control Experts, 12 pages.
(Continued)

*Primary Examiner* — Kristie Shingles
*Assistant Examiner* — Mohammad Yousuf A Mian
(74) *Attorney, Agent, or Firm* — Michael Best & Friedrich LLP (57) ABSTRACT

A keyboard-mouse-video (KVM) system. The system includes a KVM switch having a first controller; a ROC unit having a second controller; and a cable which connects the ROC unit to the KVM switch, the cable having four pairs of wires. The first controller is configured to transmit and the second controller is configured to receive an Ethernet signal using a first pair of wires. The second controller is configured to transmit and the first controller is configured to receive a serial signal using a second pair of wires.

18 Claims, 8 Drawing Sheets

(56) References Cited

U.S. PATENT DOCUMENTS

| | | | |
|---|---|---|---|
| 2009/0265491 A1 | 10/2009 | Zhang et al. | |
| 2010/0023660 A1* | 1/2010 | Liu | G06F 3/023 |
| | | | 710/71 |
| 2010/0095020 A1* | 4/2010 | Rixner | H04L 12/462 |
| | | | 709/233 |
| 2012/0030394 A1 | 2/2012 | Bird | |
| 2012/0243160 A1 | 9/2012 | Nguyen et al. | |
| 2013/0170498 A1* | 7/2013 | Danielsson | H04L 12/4015 |
| | | | 370/400 |
| 2013/0227315 A1* | 8/2013 | Hammond | G06F 1/30 |
| | | | 713/300 |

OTHER PUBLICATIONS

Desai, D.M. et al.; "BladeCenter system overview" IBM Journal of Research and Development vol. 49, No. 6, Nov. 2005; 13 pages.
Lantronix, "The Distributed KVM-over-IP Solution" 2011; 8 pages.
Chandrasekhar, B. et al.; "Cascading the Avocent Digital Access KVM Switch to a KVM Infastructure" Dell Power Solutions, May 2006, 3 pages.
Chatsworth Products, Inc.; "Analog KVM Switches"; 2010; 2 pages.
StarTech.com; "4/8-Port Enhanced Digital USB KVM Switch Over IP with File Transfer SV441DUSBI, SV841DUSBI Manual," revised Nov. 22, 2011; 52 pages.
Apass Technology Co., Ltd.; "KVM-over-IP (Dongle Type I)"; dated Dec. 11, 2013; 3 pages.
Lantronix Spider; "KVM over IP Switches"; dated Dec. 11, 2013; 3 pages.
Markertek.com; "Startech SV5USBM USB CAT5 Dongle" dated Dec. 11, 2013; 2 pages.
Startech.com; "Startech USB CAT 5 dongle" dated Dec. 11, 2013; 2 pages.
Raritan; "Dominion KX KVM-Over-IP Switch" dated Dec. 11, 2013; 1 page.
Raritan; "Dominion LX KVM-Over-IP Switch" dated Dec. 11, 2013; 1 page.
go.gis.com; "Global Infrastructure Solutions Cat 5 16 Port KVM" dated Dec. 11, 2013; 2 pages.
"KVM 16 Port Ethernet Switch" from www.kvms.com dated Dec. 11, 2013; 3 pages.
"KVM 32 Port Ethernet Switch" from www.kvms.com dated Dec. 11, 2013; 3 pages.
"42U KVM Switch" article available at www.42u.com/troubleshooting-KVM-dongles.htm dated Dec. 11, 2013; 2 pages.

\* cited by examiner

FAST VIRTUAL MEDIA KVM SYSTEM

CROSS-REFERENCE TO RELATED APPLICATIONS

This application claims priority to U.S. Provisional Patent Application No. 61/792,919 filed Mar. 15, 2013, the content of which is incorporated herein by reference in its entirety.

BACKGROUND

The present invention relates to keyboard-video-mouse (KVM) switches with virtual media support.

Figure 1:
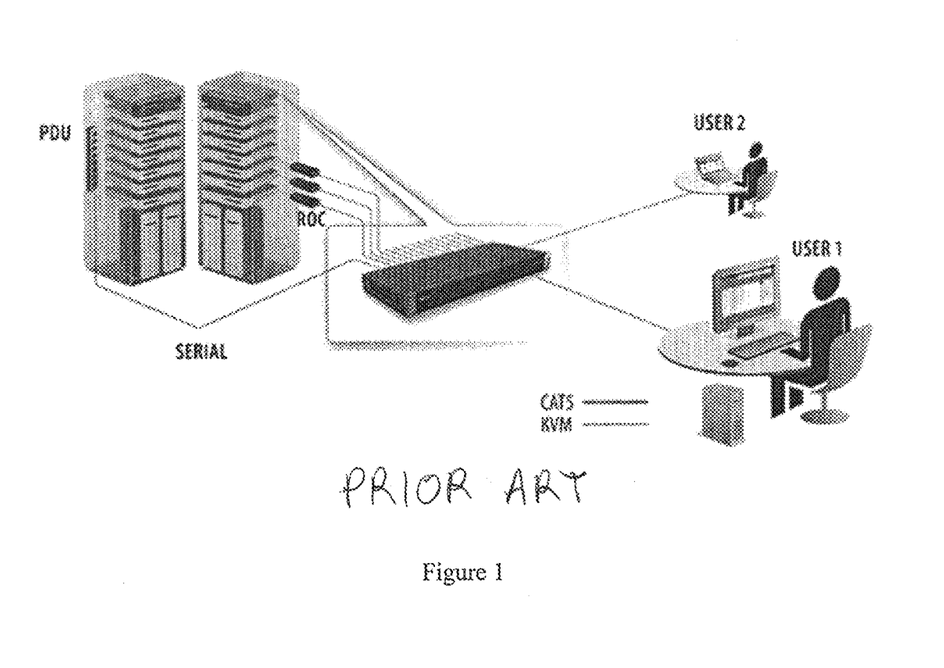
FIG. 1 shows a prior art KVM system.

KVM systems include a switch unit (also called a Smart Switch) and peripheral units (referred to herein as a "ROC", also called a "dongle"). Peripheral units are connected to one or more computers (e.g. servers) that are to be remotely controlled (see FIG. 1). The ROC unit includes serial connectors to couple to the server's keyboard and mouse (e.g. using standard serial connection formats such as USB or PS/2) as well as to the server's video output (e.g. a VGA connection), which is generally an analog component video RGB output.

Figure 2:
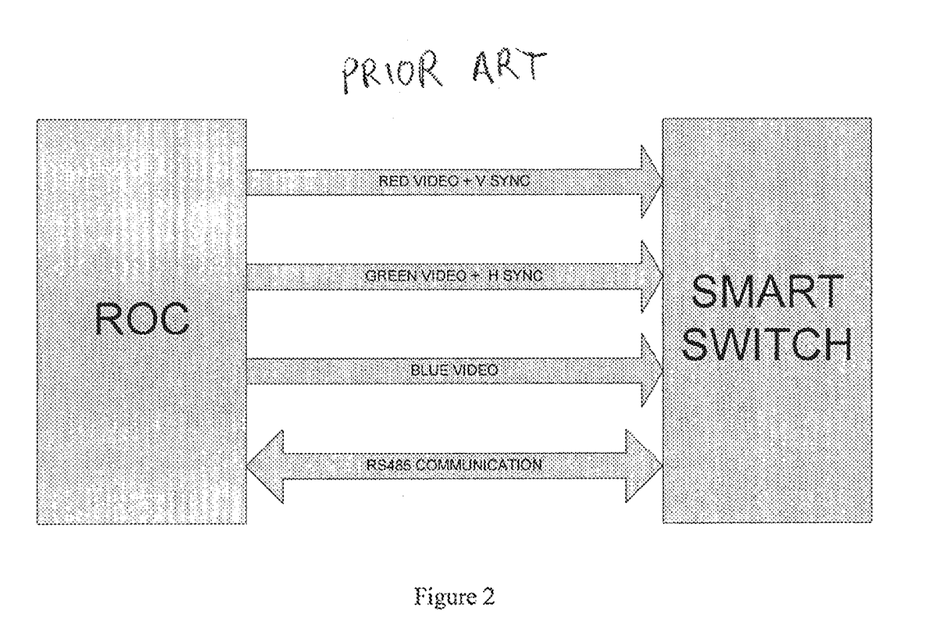
FIG. 2 shows communication lines between a ROC and a KVM switch in a prior art KVM system.

The communication between the Smart Switch and each of the ROCs is carried over a cable, typically a CAT5 cable (although other types such as CAT6 or CAT7 are possible; for clarity this discussion will use the term "CAT5" to include all such possible cable types), which connects at one end to the KVM switch and at the other end to the ROC. The CAT5 cable contains four twisted pairs of wires. Currently, the analog RGB video along with vertical and horizontal sync pulses are transferred over three of the pairs and the fourth pair is used to implement a half-duplex serial RS485 data communication between the ROC and the switch (FIG. 2). In half-duplex communication mode, each of the ROC and the switch, after a short predetermined time after finishing the transmission, changes automatically to a receive mode. In current implementations of virtual media, data transfer rates are limited to RS485 supported rates in each direction.

While the data transfer rate of this serial communication protocol is sufficient for transmitting signals relating to keyboard and mouse operation, it is relatively slow when it comes to transmitting data files, for example when accessing virtual media. Remote virtual media is a method of connecting a remote media source (i.e. CD-ROM drive, hard disk drive, floppy disk drive, or virtual implementation of any of them) to a local system. The local system can access the remote (and possibly virtual) media and can potentially read from and write to that media as if it were physical and local. Examples of remote media include a physical disk drive of any type available remotely to a local computer.

Remote virtual media is a useful tool for those who manage large numbers of computers, such as commercial IT data center managers. A local computer can boot to one of many virtual disks that can perform any variety of tasks, such as virus scans of the local physical drive and patch management, or even complete installation of the local operating system.

However, a faster data transfer rate is needed between the KVM switch and the ROC in order to provide adequate support for the amount of data users wish to transfer.

SUMMARY

In one embodiment, the invention provides a keyboard-mouse-video (KVM) system. The system includes a KVM switch having a first controller; a ROC unit having a second controller; and a cable which connects the ROC unit to the KVM switch, the cable having four pairs of wires. The first controller is configured to transmit and the second controller is configured to receive an Ethernet signal using a first pair of wires. The second controller is configured to transmit and the first controller is configured to receive a serial signal using a second pair of wires.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Disclosed herein is an implementation of a KVM system which facilitates high-speed (100 Mbit/sec) data transfer from the KVM switch to a computer that is connected via a ROC. This "fast virtual media" system is implemented using an Ethernet-based communication protocol, instead of a RS485 serial protocol, to provide faster data transfer from the KVM switch to the ROC. In one embodiment, Ethernet communications may be used for both directions, i.e. from the KVM switch to the ROC and from the ROC to the KVM switch, on a single pair of wires by changing direction according to a half-duplex protocol. In another embodiment, an asymmetric full-duplex communication protocol may be used in which unidirectional Ethernet 100Base-T communications are used for communication from the KVM switch to the ROC while serial asynchronous unidirectional communication is used from the ROC to the KVM switch.

Figure 3:
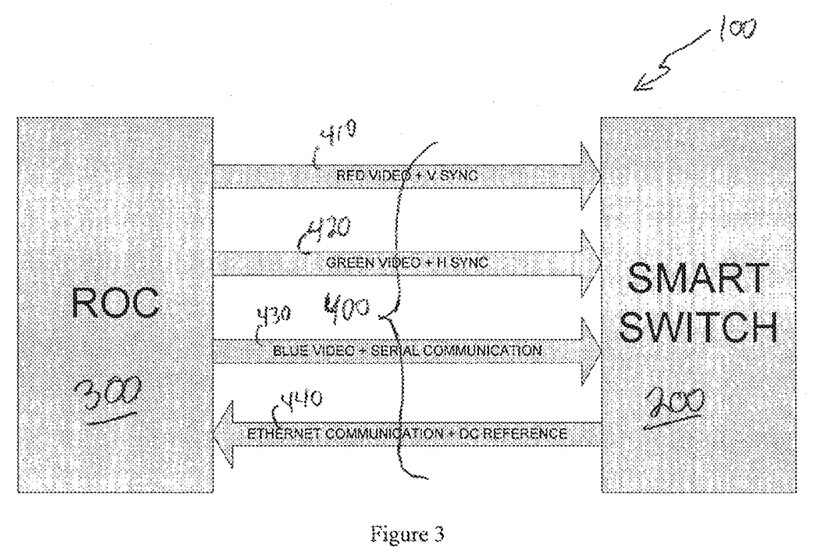
FIG. 3 shows communication lines between a ROC and a KVM switch in an embodiment of the fast virtual media KVM system.
Figure 4:
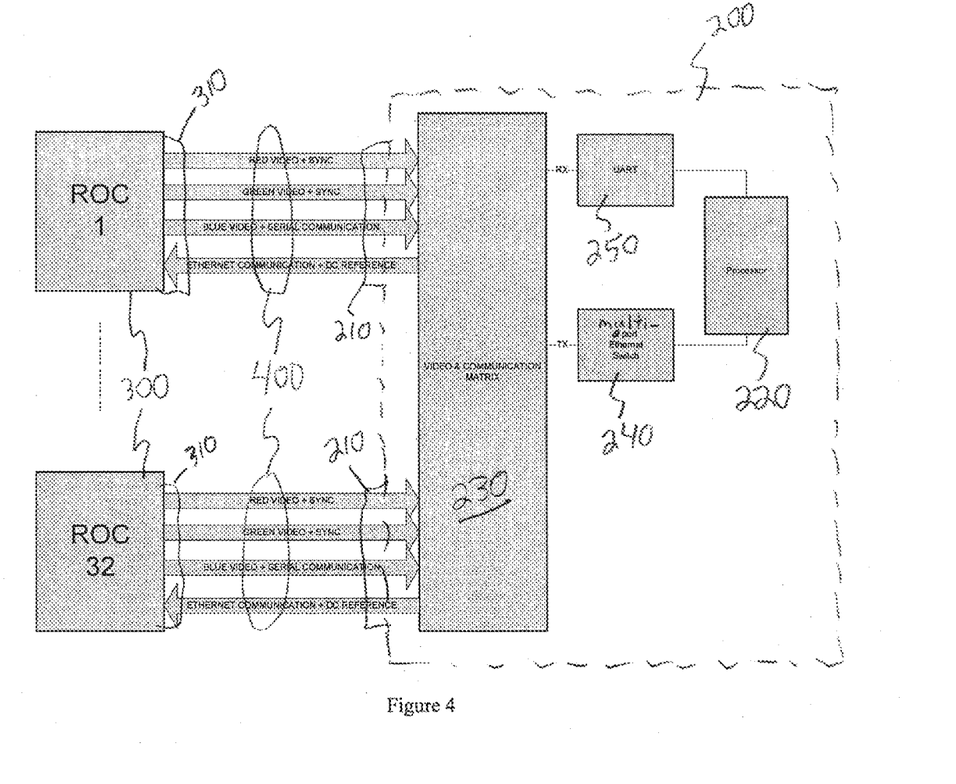
FIG. 4 shows detail inside a KVM switch in an embodiment of the fast virtual media KVM system along with a plurality of ROC units.
Figure 7:
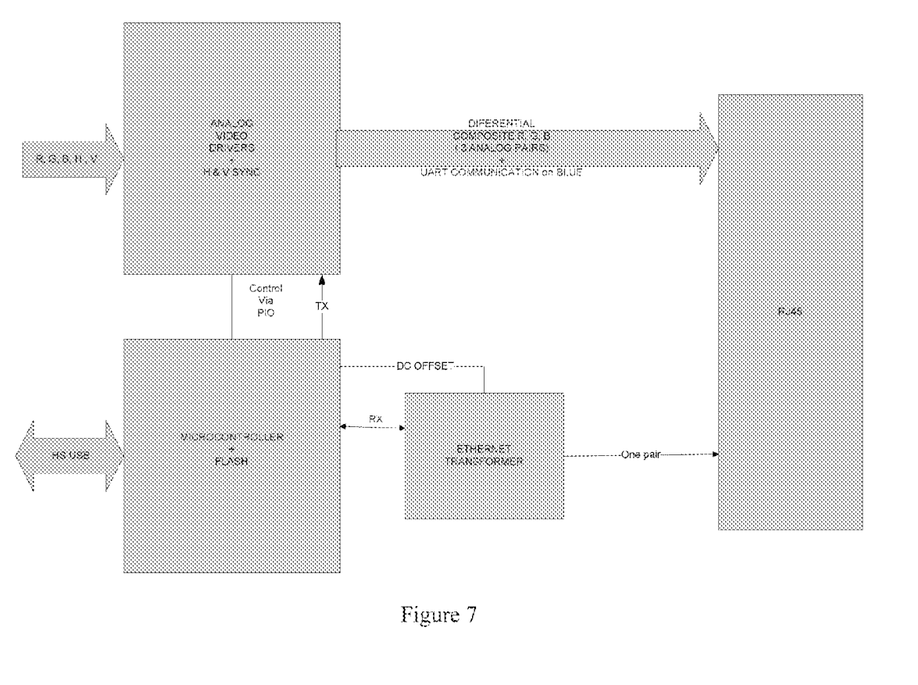
FIG. 7 shows detail inside a ROC unit in an embodiment of the fast virtual media KVM system.

FIG. 3 shows a diagram of an implementation of a fast virtual media KVM system 100, including a KVM switch 200 connected by a cable 400 to a ROC unit 300. The cable 400 includes several wires or pairs of wires; in the embodiment shown in FIG. 4 there are four pairs of wires indicated by arrows 410, 420, 430, 440. Each arrow 410, 420, 430, 440 indicates information carried on the respective pair of wires as well as the direction of information flow. The KVM switch 200 includes a plurality of ports 210 (also called "server ports"), each of which accepts a cable 400 to connect to a ROC unit 300 and a computer (FIGS. 3 and 4). The KVM switch 200 also includes a processor 220 for controlling activity of the switch including coordinating communications at each of the ports 210 (FIG. 4). The KVM switch 200 may include one or more network ports for connecting to a remote client on a network such as the Internet, as well as suitable ports for connecting a local terminal, including keyboard, mouse, and video ports. As discussed above, each ROC unit 300 includes suitable cabling to connect to the keyboard, mouse, and video ports of the computer that is to be controlled via the KVM switch 200. The ROC unit 300 also includes a port 310 for connecting the cable 400 leading to the KVM switch 200. Finally, the ROC unit 300 includes a processor for controlling activity of the ROC unit 300 including coordinating communication between the port 310 and the keyboard, video, and mouse connections. Further technical details of an embodiment of elements of the fast virtual media KVM system 100 are shown in FIG. 7 (ROC unit 300).

The KVM switch 200 also includes a video and communications matrix 230 which mediates communications between the ports 210 and a multi-port Ethernet switch 240 and a UART (universal asynchronous receiver/transmitter) 250; the processor 220 controls the 9 port Ethernet switch 240 and the UART 250 (FIG. 4).

In one particular embodiment, the cable 400 is a CAT5 cable and the pairs of wires 410, 420, 430, 440 are twisted pairs. In this embodiment, the ports 210, 310 on the KVM switch 200 and the ROC unit 300, respectively, are suitable for accepting a CAT5 cable which may have a RJ45 plug at each end. Also in this embodiment, serial communication from the ROC unit 300 to the KVM switch 200 is implemented by modulating the offset of the blue video signal. The component video colors (red, green, blue) are each transmitted as a differential signal, each over one of the twisted pairs. Along with the red and green video signals, two of the twisted pairs include the horizontal and vertical video sync signals, respectively, which are transmitted by modulating the DC offset of the respective differential video signals. The reference DC for the horizontal and vertical video sync signals and for the serial RS485 is transmitted over the common of the Ethernet signals.

Arrow 410 (FIG. 3) indicates wires which carry the red video signal plus vertical sync signal from the ROC unit 300 to the KVM switch 200; arrow 420 indicates wires which carry the green video signal and the horizontal sync from the ROC unit 300 to the KVM switch 200; arrow 430 indicates wires which carry the blue video signal plus the serial communications signal from the ROC unit 300 to the KVM switch 200; and arrow 440 indicates wires which carry Ethernet communications from the KVM switch 200 to the ROC unit 300 plus a DC reference signal. In various embodiments, the signals may be assigned to various pairs of wires differently than the arrangement that is shown and described herein.

In this way, data is transferred at a 100 Mbit/sec baud-rate from the switch to the ROC and up to the RS485 allowed bit rate in the reverse direction. In general, even slow speeds are sufficiently fast for data transfer from the ROC unit 300 to the KVM switch 200. In certain embodiments, the KVM switch 200 incorporates standard Ethernet switches and communications coprocessors to implement the Ethernet communications to the ROC unit 300 (FIG. 3).

In various embodiments, the KVM switch 200 can be configured to work with ROC units 300 which communicate using different protocols, including the prior art half-duplex RS485 serial protocol as well as the asymmetric full-duplex Ethernet-serial protocol disclosed herein, or other protocols. To determine what type of communication protocol each ROC unit 300 is using, the KVM switch 200 performs a scan of all of the ports 210 to determine whether there is a ROC unit 300 connected to the port 200 and what kind of communication protocol each ROC unit 300 is configured to use.

In one embodiment, the scan starts by checking each port 210 to determine whether a connected ROC unit 300 is operating with an RS485 protocol by sending out a 56 Kbps baud rate signal. If the ROC unit 300 is a regular (i.e. supports keyboard, video, and mouse function, but not data transfer) or VM ROC (supports data transfer/virtual media as discussed above) but not a fast virtual media ROC (i.e. as disclosed herein), it will respond with a scan acknowledgement signal at the same baud rate (i.e., at 56 Kbps). If no answer is received by the KVM switch 200 after sending the initial serial query, the KVM switch 200 then sends a message to the ROC unit 300 in Ethernet format and will monitor the answer over the serial link (which in some embodiments may be sent via the pair of wires carrying the blue video signal common mode as a differential signal, as discussed above). The information sent from a ROC unit 300 that is configured for fast virtual media will include its MAC Address. In this way the KVM switch processor 220 maps all its ports and determines what kind of ROC is connected to each port and whether the ROC is operating using the fast virtual media protocol and what MAC Address each ROC unit 300 has.

Because the KVM switch 200 only transmits Ethernet information to the ROC unit 300 and does not receive any Ethernet communication in return from the ROC unit 300, it cannot build a lookup table with the source/destination MAC addresses as is generally done in an Ethernet-based switch. The KVM switch processor 220 will initialize the multi-port Ethernet switch lookup table with the path relevant for each fast virtual media ROC (i.e. the MAC address of the fast virtual media ROC and the corresponding KVM switch port 210 to which it is connected). This initialization will allow a message directed to a particular ROC unit 300 to reach the correct destination and not to be flooded to all the KVM switch ports 210. The information regarding the type of ROC unit 300 and its MAC address for connection to each port 210 is determined by the scan process.

Figure 5:
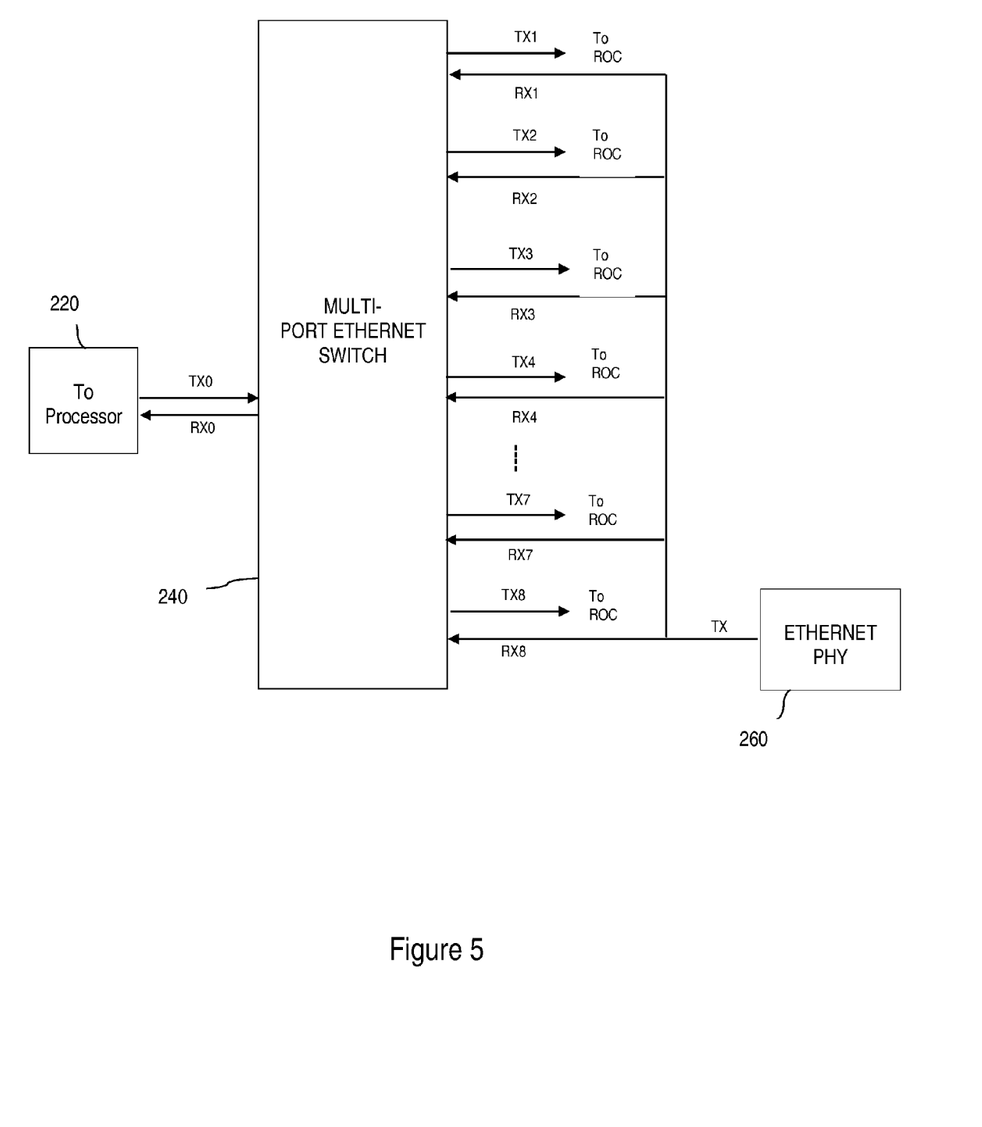
FIG. 5 shows detail inside a KVM switch in an embodiment of the fast virtual media KVM system.

Since the KVM switch 200 Ethernet switch does not have a "receive Ethernet" link from the ROC units 300, each KVM switch 200 link does not attain the state of "link up" based on the connection with the ROC unit 300. In order to change the switch link status to "link up," each of the Ethernet switch receive inputs are connected to an Ethernet PHY transmitter 260 (which provides a PHY in a "forced" link up mode) (FIG. 5).

Figure 6:
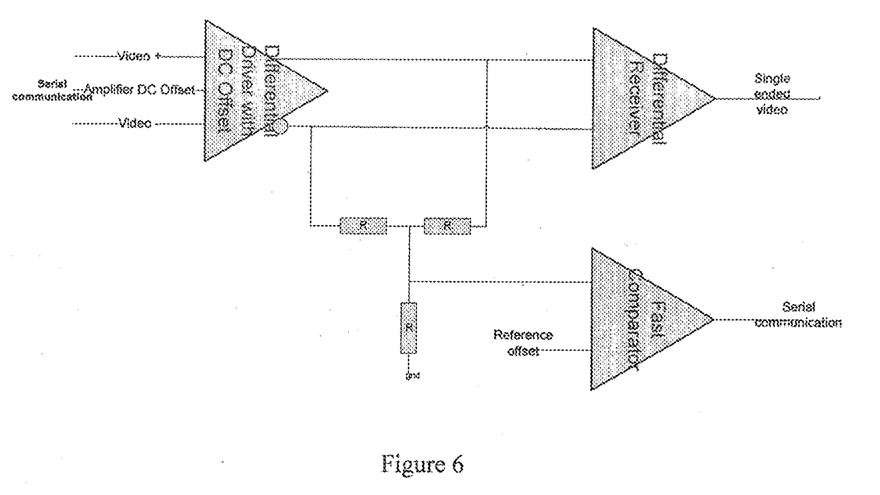
FIG. 6 shows details of how video and serial communications are combined.

As noted previously, the fast virtual media ROC unit 300 communication in the KVM switch 200 direction is superimposed on the blue video signal as a common voltage for the differential blue video (FIG. 6). The reference DC level is sent as a common voltage over the Ethernet transformer (goes on both wires of the fourth pair of wires of the CAT5 cable by connecting the CM signal to the center tap of the Ethernet transformer). In the KVM switch 200 the two above signals are compared by a high speed comparator, the output of which is the serial communication from the fast virtual media ROC, and that output is connected to the UART. UART output is connected to the KVM switch processor 220 via the local bus (FIG. 4).

Figure 8:
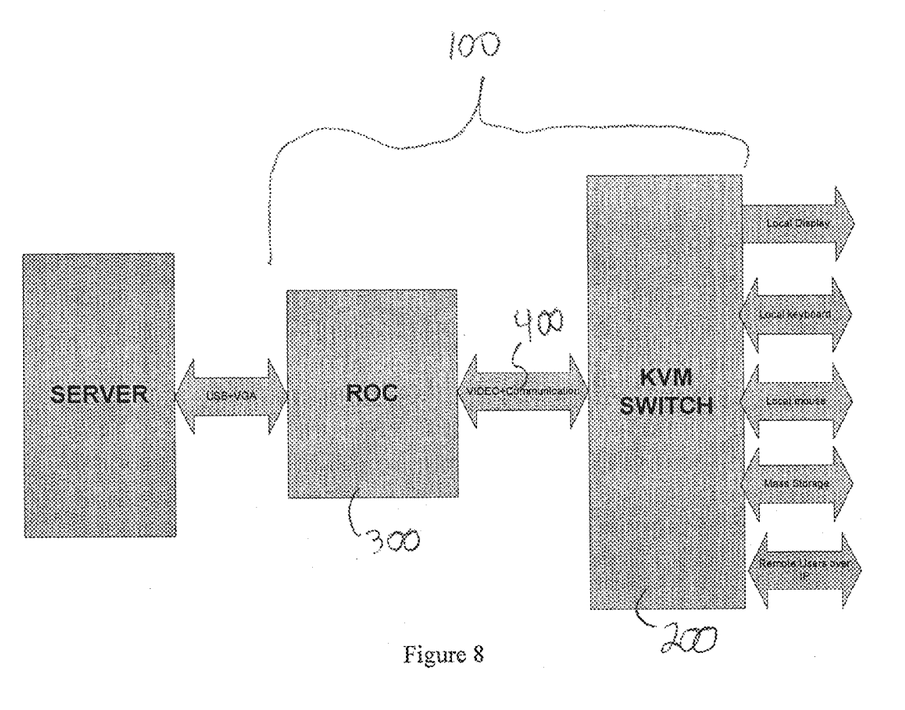
FIG. 8 shows a diagram of a KVM switch and ROC unit in an embodiment of the fast virtual media KVM system coupled to a server.

By connecting to a network such as the Internet using a network port of the KVM switch 200, remote clients can gain access to a computer such as a server that is accessible through the KVM switch 200. Having gained access, a user operating a remote client can connect the server to virtual media including various network-attached storage devices or servers that can be shared remotely, for example using NFS, Samba, or other network file system protocols. The network storage can be mapped by the KVM Switch or by the remote client communicating with the KVM switch. Likewise, a user can gain access to one of the connected servers by using a keyboard, mouse, and video terminal that is connected directly to the KVM switch 200 (FIG. 8).

Thus, the KVM system provides data transfer at a high rate to support fast virtual media. Various features and advantages of the invention are set forth in the following claims.

What is claimed is:

1. A keyboard-mouse-video (KVM) system, comprising:
a KVM switch having a first controller;
a ROC unit having a second controller; and
a cable which connects the ROC unit to the KVM switch, the cable a first pair of wires and a second pair of wires, and
wherein
the first controller is configured to transmit and the second controller is configured to receive an Ethernet signal using the first pair of wires, and
the second controller is configured to simultaneously transmit and the first controller is configured to receive a common-mode serial signal and a differential-mode component video signal using the second pair of wires.

2. The system of claim 1, wherein the KVM switch comprises a plurality of server ports and wherein the ROC unit is coupled to one of the plurality of server ports.

3. The system of claim 2, wherein the ROC unit is coupled to a server.

4. The system of claim 3, wherein the KVM switch further comprises a network port and wherein the first controller is further configured to connect the KVM switch to a remote client using the network port.

5. The system of claim 4, wherein the first controller is further configured to connect the remote client to the server.

6. The system of claim 1, wherein the second controller is further configured to transmit a DC signal on the first pair of wires as a common mode reference for the common-mode serial signal received from the second controller.

7. The system of claim 1, wherein the cable further includes a third pair of wires and a fourth pair of wires, wherein the second controller is further configured to transmit a differential-mode component video signal and one of a common-mode vertical sync signal and a common-mode horizontal sync signal on each of the third pair of wires and the fourth pair of wires.

8. The system of claim 1, wherein the cable is a CAT5 cable, a CAT6 cable, or a CAT7 cable.

9. The system of claim 1, wherein the Ethernet signal is transmitted at a rate of 100 Mbit/sec unidirectionally by the first controller and received by the second controller.

10. A keyboard-mouse-video (KVM) system, comprising:
a KVM switch having a first controller;
a ROC unit having a second controller; and
a cable which connects the ROC unit to the KVM switch, the cable having a first pair of wires and a second pair of wires, and
wherein
the first controller is configured to transmit and the second controller is configured to receive an Ethernet signal using the first pair of wires, and
the second controller is configured to transmit and the first controller is configured to receive a common-mode serial signal and a differential-mode component video signal using the second pair of wires.

11. The system of claim 10, wherein the KVM switch comprises a plurality of server ports, and wherein the first controller is further configured to
transmit a serial query signal to each of the plurality of server ports,
wait for a response from each of the plurality of server ports,
send the Ethernet signal to each of the plurality of server ports that do not respond to the serial signal,
identify at least one server port having a fast virtual media ROC unit connected thereto, and
obtain a MAC address from the common-mode serial signal transmitted by the second controller of the fast virtual media ROC unit.

12. The system of claim 11, wherein the KVM switch further comprises a multi-port Ethernet switch and a multi-port Ethernet switch lookup table, and wherein the first controller is further configured to initialize the multi-port Ethernet switch lookup table by providing the MAC address and a server port identification for the at least one server port having a fast virtual media ROC unit connected thereto.

13. The system of claim 12, wherein the KVM switch further comprises an Ethernet PHY transmitter, and wherein each of the Ethernet switch receive inputs of the multi-port Ethernet switch is connected to the Ethernet PHY transmitter to put each port of the multi-port Ethernet switch into a forced link-up mode.

14. A keyboard-mouse-video (KVM) system, comprising:
a cable including a first pair of wires and a second pair of wires;
a switch coupled to the cable and inducting a first controller, the first controller configured to:
transmit an Ethernet signal on the first pair of wires, and
receive a common-mode serial signal on the second pair of wires; and
a peripheral unit coupled to the cable and including a second controller, the second controller configured to:
receive the Ethernet signal from the first pair of wires, and
simultaneously transmit the common-mode serial signal and a first differential-mode component video signal using the second pair of wires.

15. The system of claim 14, wherein the cable further includes a third pair of wires, wherein the second controller is further configured to simultaneously transmit a second differential-mode component video signal and a common-mode vertical sync signal on the third pair of wires.

16. The system of claim 15, wherein the cable further includes a fourth pair of wires, wherein the second controller is further configured to simultaneously transmit a third differential-mode component video signal and a common-mode horizontal sync signal on the fourth pair of wires.

17. The system of claim 14, wherein the second controller is further configured to transmit a DC signal on the first pair of wires.

18. The system of claim 17, wherein the first controller is further configured to determine a universal asynchronous receiver/transmitter (UART) signal based on a comparison of the common-mode serial signal and the DC signal.

* * * * *